US012603463B2

(12) United States Patent
Hsu et al.

(10) Patent No.: US 12,603,463 B2
(45) Date of Patent: Apr. 14, 2026

(54) ELECTRICAL CONNECTOR ASSEMBLY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Chun-Hsiung Hsu, New Taipei (TW); Yi-Min Hsu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 243 days.

(21) Appl. No.: 18/231,995

(22) Filed: Aug. 9, 2023

(65) Prior Publication Data

US 2024/0063587 A1 Feb. 22, 2024

(30) Foreign Application Priority Data

Aug. 19, 2022 (CN) ......................... 202210999434.1

(51) Int. Cl.

| | |
|---|---|
| ***H01R 13/6596*** | (2011.01) |
| ***H01R 13/24*** | (2006.01) |
| ***H01R 13/516*** | (2006.01) |
| ***H01R 13/6585*** | (2011.01) |

(52) U.S. Cl.

CPC ..... *H01R 13/6596* (2013.01); *H01R 13/2407* (2013.01); *H01R 13/516* (2013.01); *H01R 13/6585* (2013.01)

(58) Field of Classification Search

CPC .............. H01R 13/2407; H01R 13/516; H01R 13/6585

USPC ................................... 439/108, 79, 497, 947

See application file for complete search history.

(56) References Cited

U.S. PATENT DOCUMENTS

| | | | | |
|---|---|---|---|---|
| 9,559,446 | B1 * | 1/2017 | Wetzel | H01R 12/724 |
| 10,367,308 | B2 | 7/2019 | Little et al. | |
| 10,559,930 | B2 | 2/2020 | Little | |
| 11,050,176 | B2 * | 6/2021 | Yang | H01R 43/02 |

(Continued)

FOREIGN PATENT DOCUMENTS

| | | |
|---|---|---|
| CN | 208955247 U | 6/2019 |
| TW | M614325 U | 7/2021 |

*Primary Examiner* — Phuong K Dinh
(74) *Attorney, Agent, or Firm* — Ming Chieh Chang

(57) ABSTRACT

An electrical connector assembly includes: an insulative housing forming a front mating slot and a rear receiving space; a terminal module assembly received in the insulative housing and including an upper part and a lower part stacked with each other in a vertical direction, each of the upper part and the lower part comprising a high-speed terminal module and a sideband terminal module, the high-speed terminal module having an insulator and plural high-speed terminals fixed in the insulator, the high-speed terminals comprising plural ground terminals and differential pair terminals arranged alternately with the ground terminals in a transverse direction, each of the differential pair terminals and the ground terminals defining a mating portion, a tail opposite to the mating portion, and a transition portion therebetween; and a ground member mechanically and electrically connected to the transition portions of the ground terminals to form a common ground.

17 Claims, 18 Drawing Sheets

(56) References Cited

U.S. PATENT DOCUMENTS

| | | | |
|---|---|---|---|
| 2020/0274267 | A1 | 8/2020 | Zerebilov et al. |
| 2020/0358227 | A1 | 11/2020 | Henry et al. |
| 2021/0351536 | A1 | 11/2021 | Chung et al. |
| 2021/0351547 | A1 | 11/2021 | Little et al. |
| 2022/0173555 | A1 | 6/2022 | Little |

* cited by examiner

ELECTRICAL CONNECTOR ASSEMBLY

BACKGROUND OF THE INVENTION

Field of the Invention

The present invention relates generally to an electrical connector assembly, and particularly to an electrical connector assembly suitable for transmitting high-speed signals.

Description of Related Arts

U.S. patent Ser. No. 10/559,930 discloses an electrical connector assembly comprising a high-speed terminal and a sideband terminal. The sideband terminal is mounted to the external printed circuit board, and the high-speed terminal is connected to a cable. The high-speed terminals include ground terminals and signal terminals, the ground terminals are discrete and not connected as a whole, which affects the signal transmission effect.

An improved electrical connector assembly is desired.

SUMMARY OF THE INVENTION

The objective of the present invention is to provide an electrical connector that suitable for transmitting high-speed signals.

To achieve the above object, an electrical connector assembly comprises: an insulative housing forming a front mating slot and a rear receiving space; a terminal module assembly received in the insulative housing and including an upper part and a lower part stacked with each other in a vertical direction, each of the upper part and the lower part comprising a high-speed terminal module and a sideband terminal module, the high-speed terminal module having an insulator and a plurality of high-speed terminals fixed in the insulator, the high-speed terminals comprising a plurality of ground terminals and differential pair terminals arranged alternately with the ground terminals in a transverse direction perpendicular to the vertical direction, each of the differential pair terminals and the ground terminals defining a mating portion, a tail opposite to the mating portion, and a transition portion therebetween; and a ground member mechanically and electrically connected to the transition portions of the ground terminals to form a common ground.

Compared to prior art, in the electrical connector assembly of the present invention, the ground member is mechanically and electrically connected to the transition portions of corresponding ground terminals to form a common ground, which has better anti-interference and grounding effects, so that the electrical connector assembly has better signal transmission performance.

DETAILED DESCRIPTION OF THE PREFERRED EMBODIMENT

Figure 1:
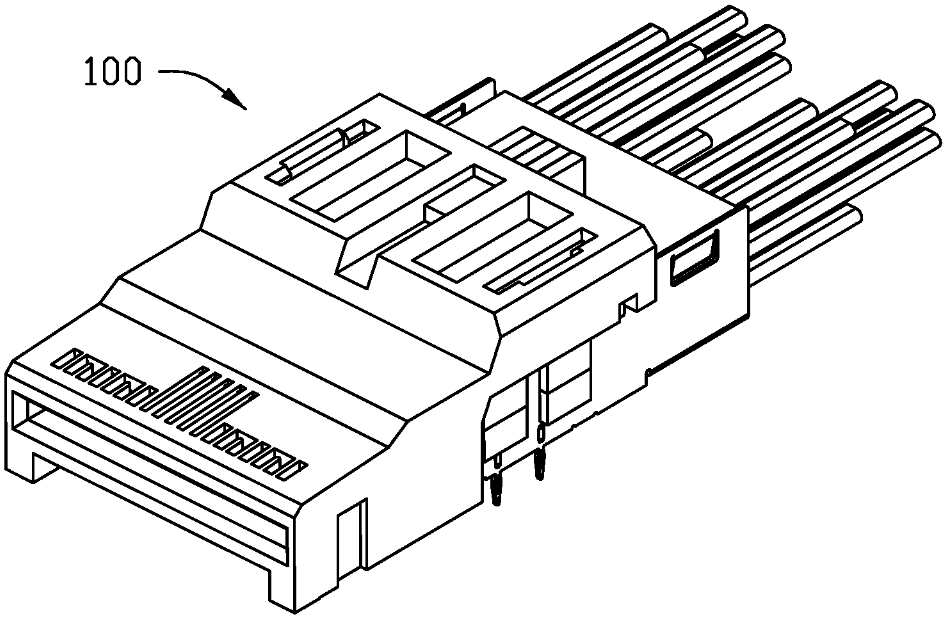
FIG. 1 is a perspective view of an electrical connector assembly according to the present invention.
Figure 2:
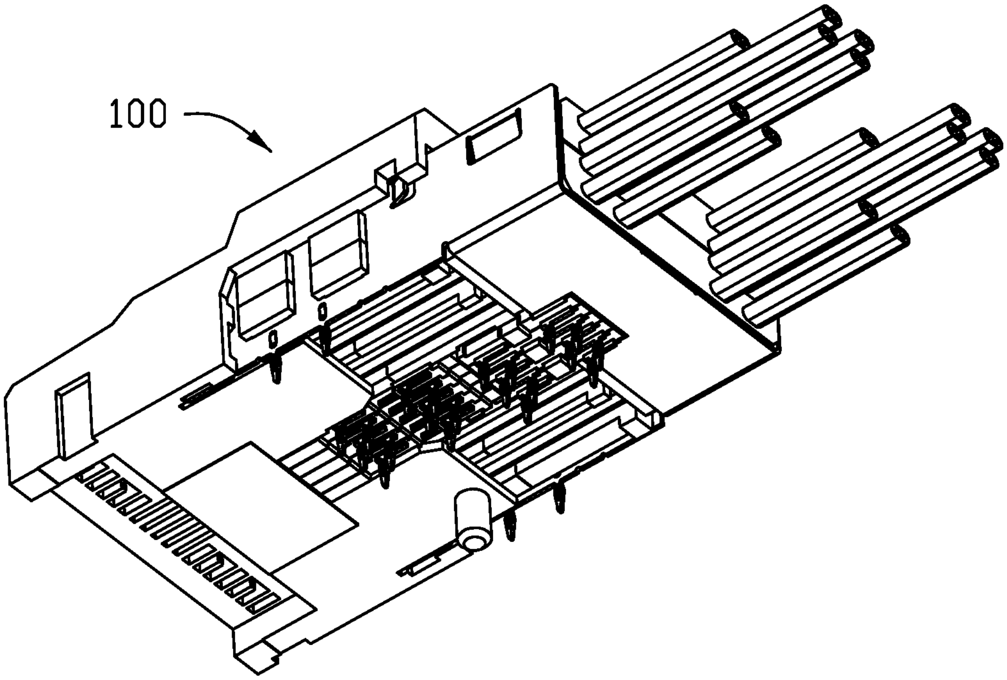
FIG. 2 is another perspective view of the electrical connector assembly of FIG. 1.
Figure 3:
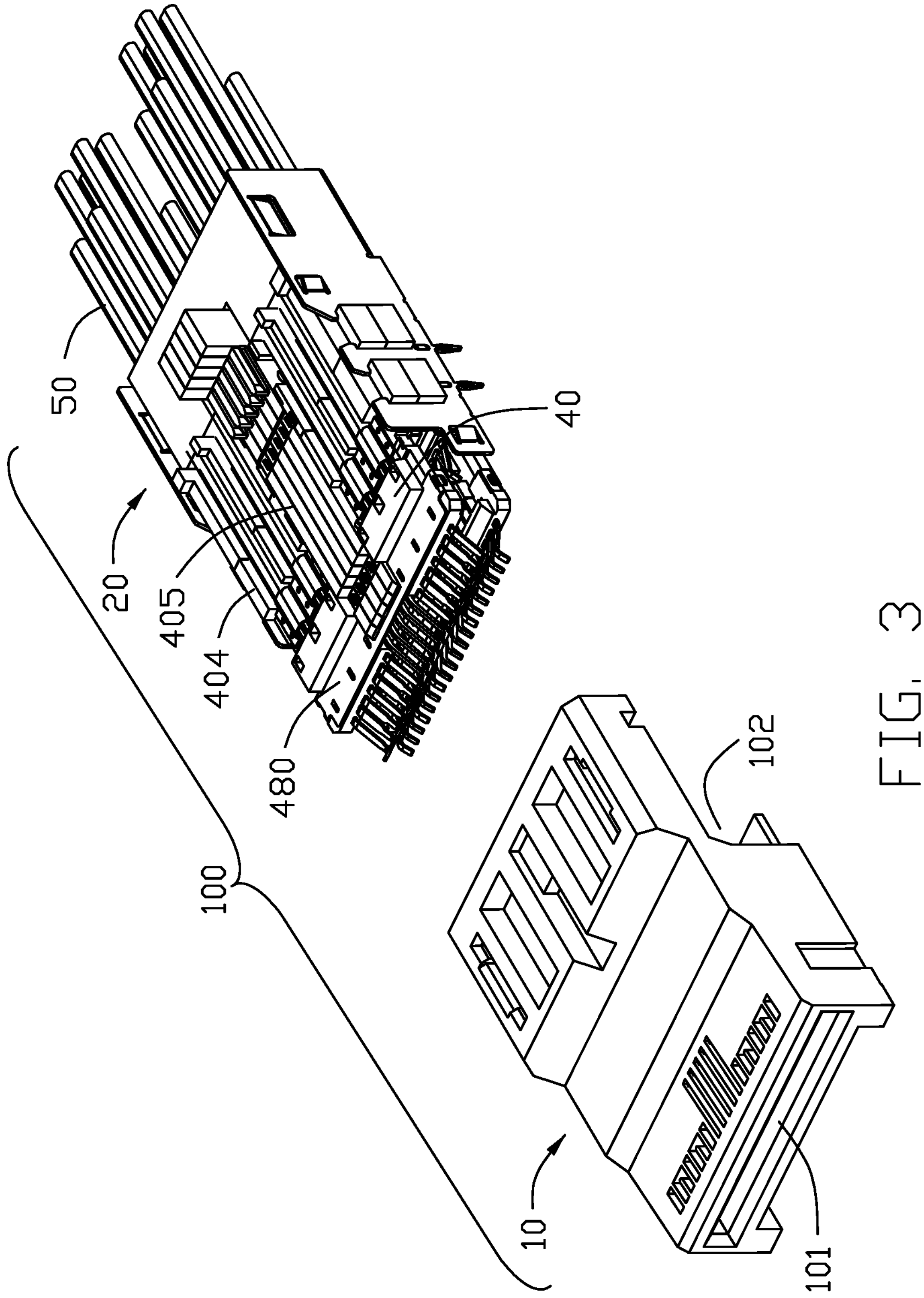
FIG. 3 is an exploded perspective view of the electrical connector assembly of FIG. 1.
Figure 4:
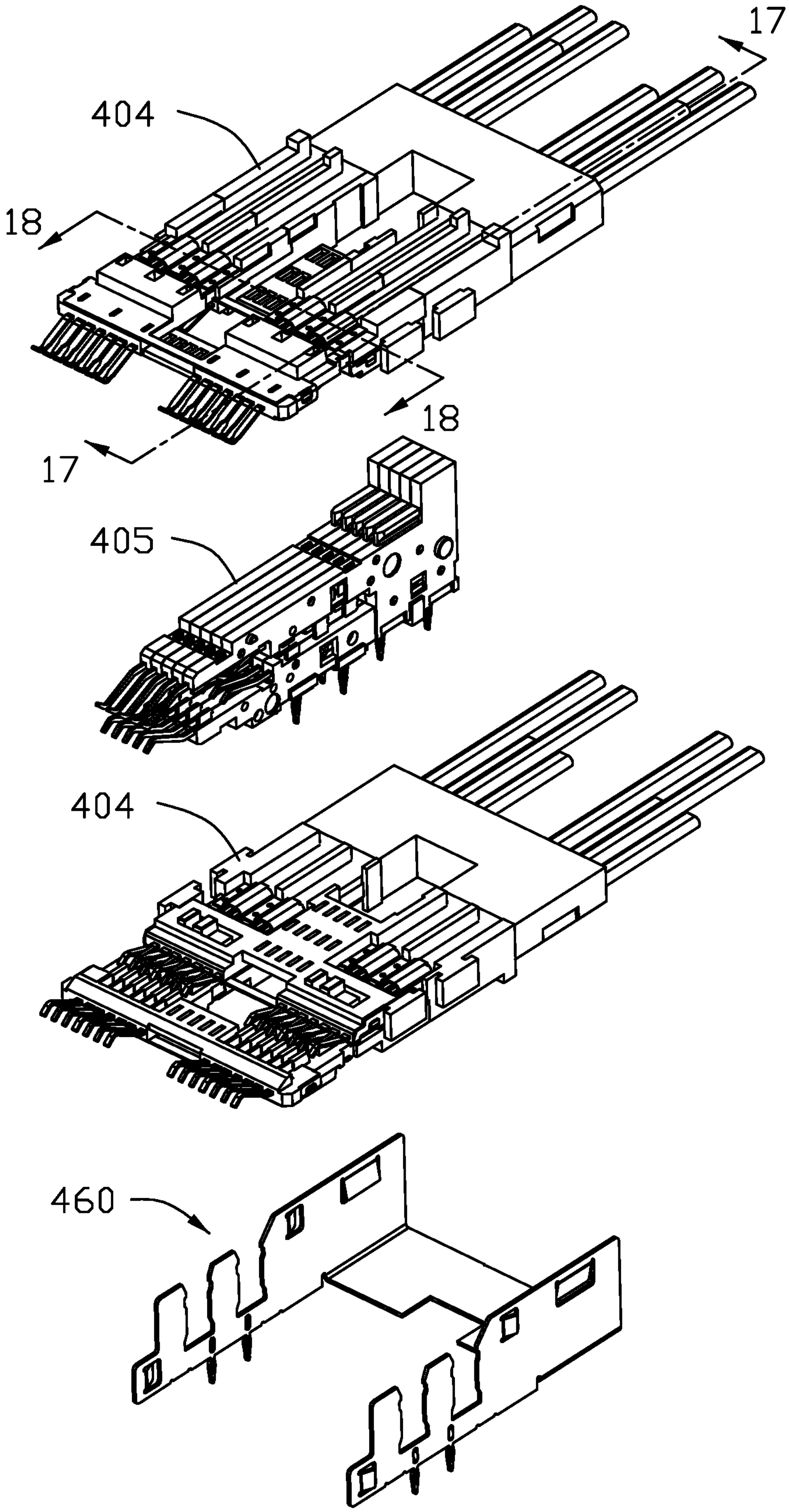
FIG. 4 is an exploded perspective view of the electrical connector assembly of FIG. 3 without showing the insulative housing.
Figure 5:
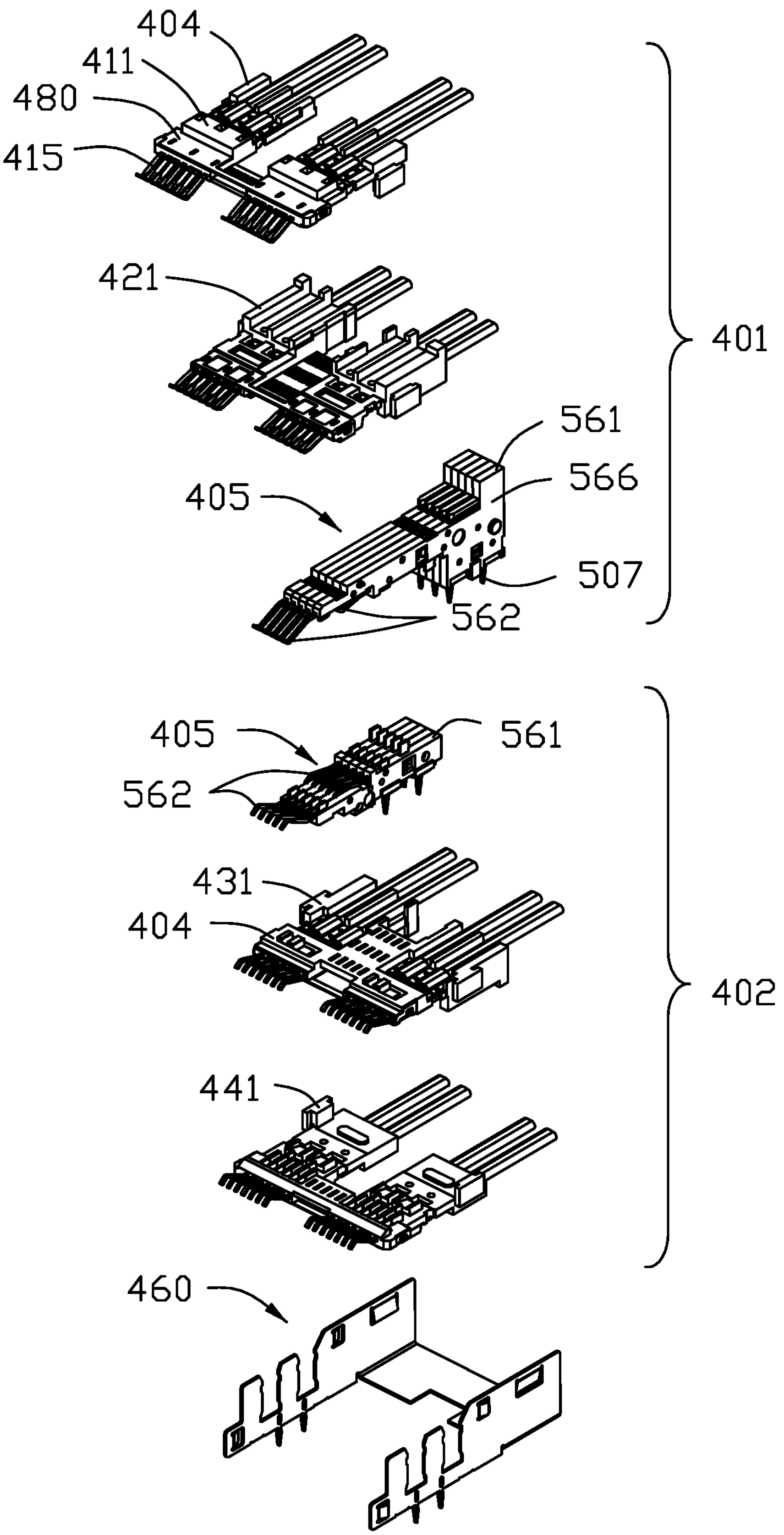
FIG. 5 is an exploded perspective view of the terminal module of the electrical connector assembly of FIG. 4.
Figure 6:
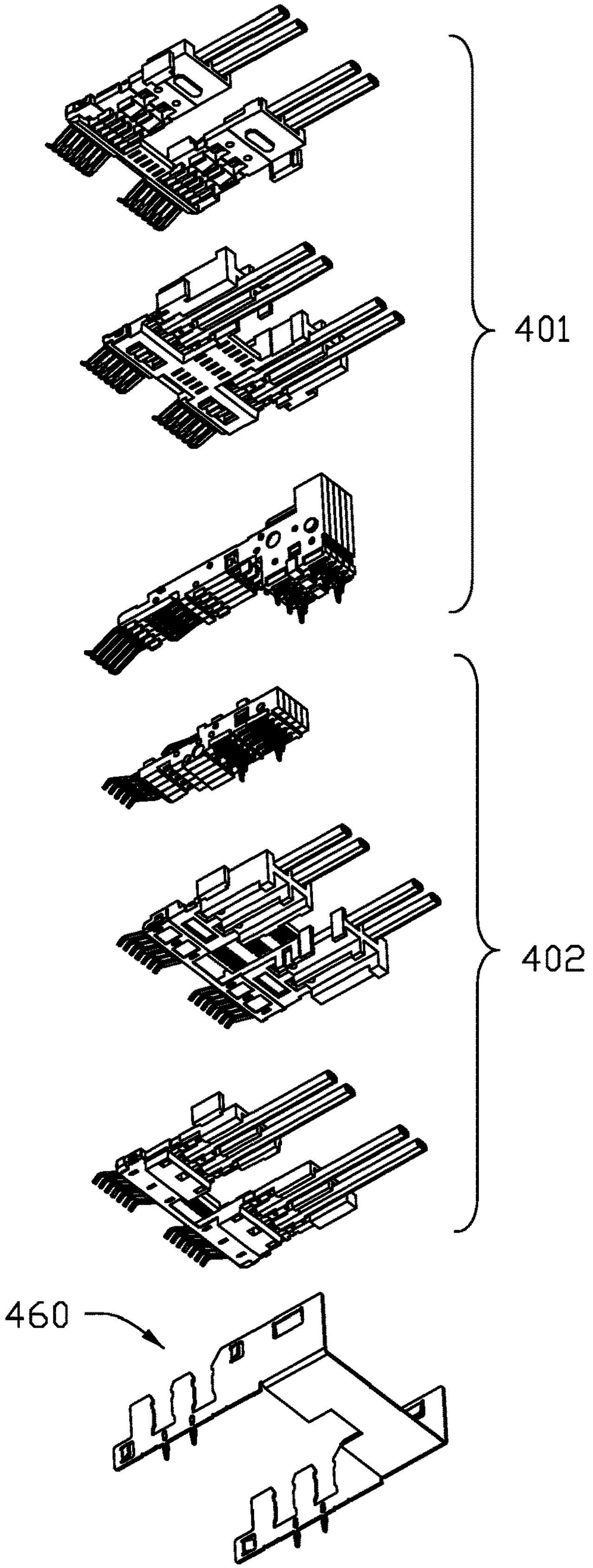
FIG. 6 is another exploded perspective view of the terminal module of the electrical connector assembly of FIG. 5.
Figure 7:
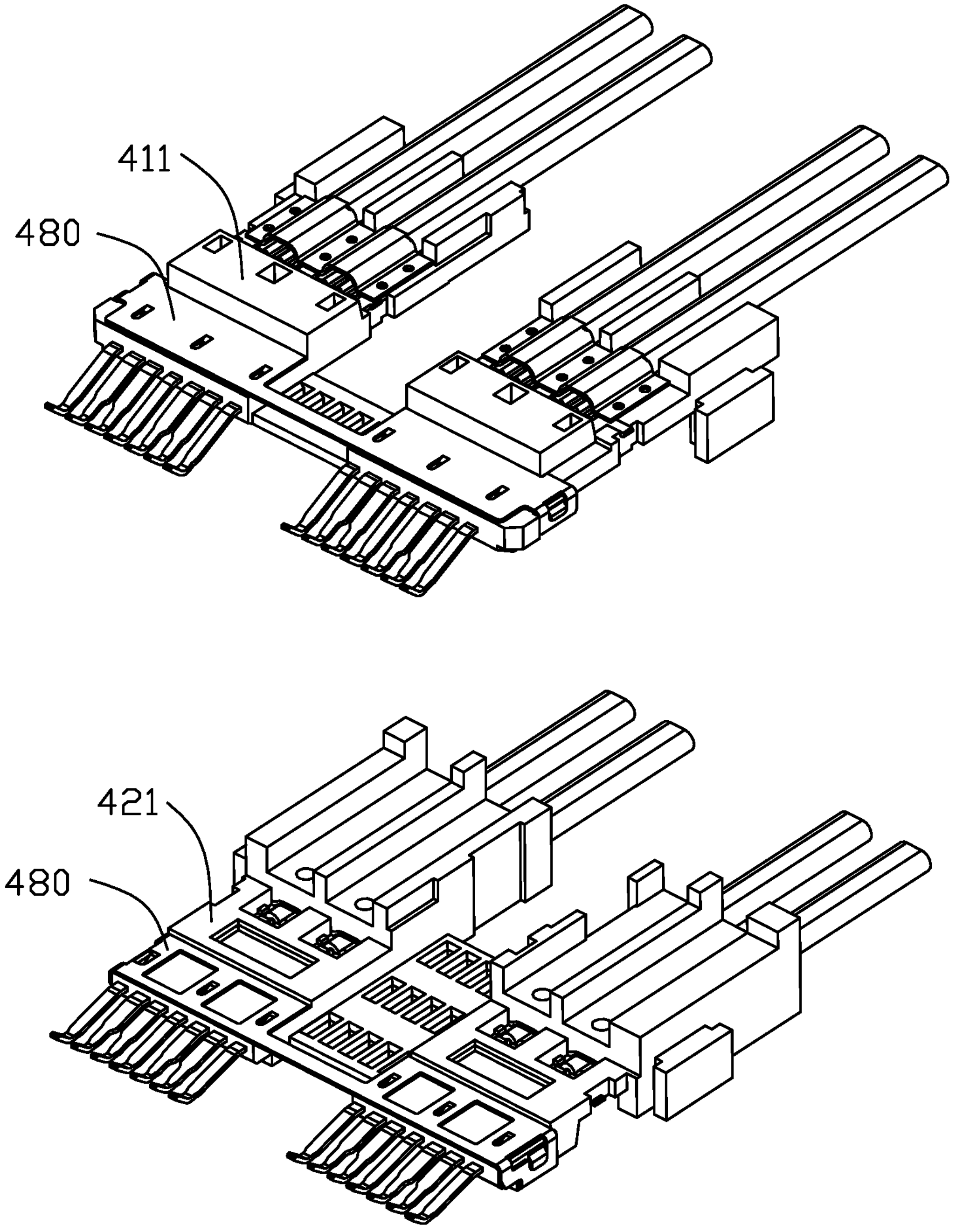
FIG. 7 is an exploded perspective view of the high-speed terminal module of the upper part of the electrical connector assembly of FIG. 5.
Figure 8:
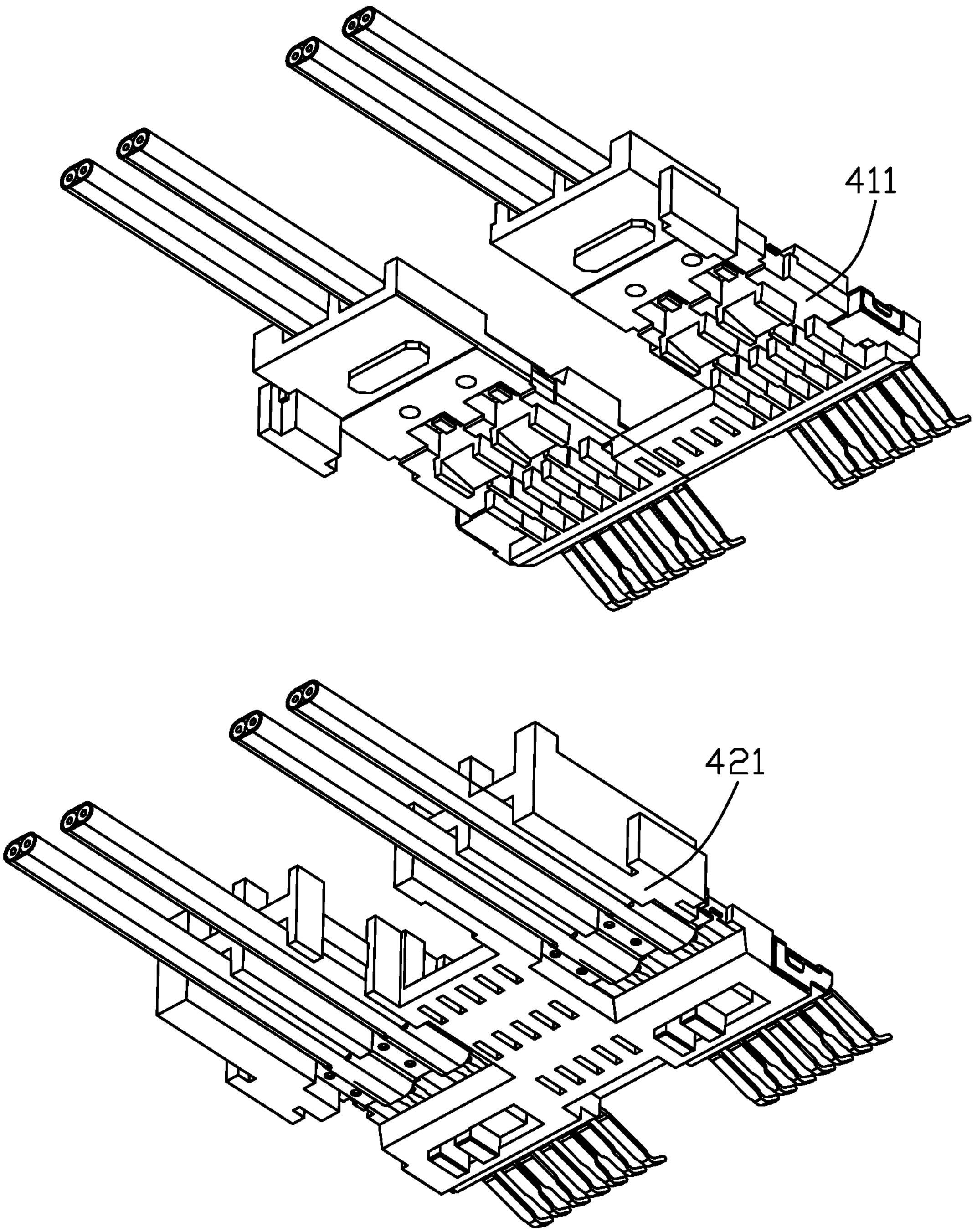
FIG. 8 is another exploded perspective view of the high-speed terminal module of the upper part of the electrical connector assembly of FIG. 5.
Figure 9:
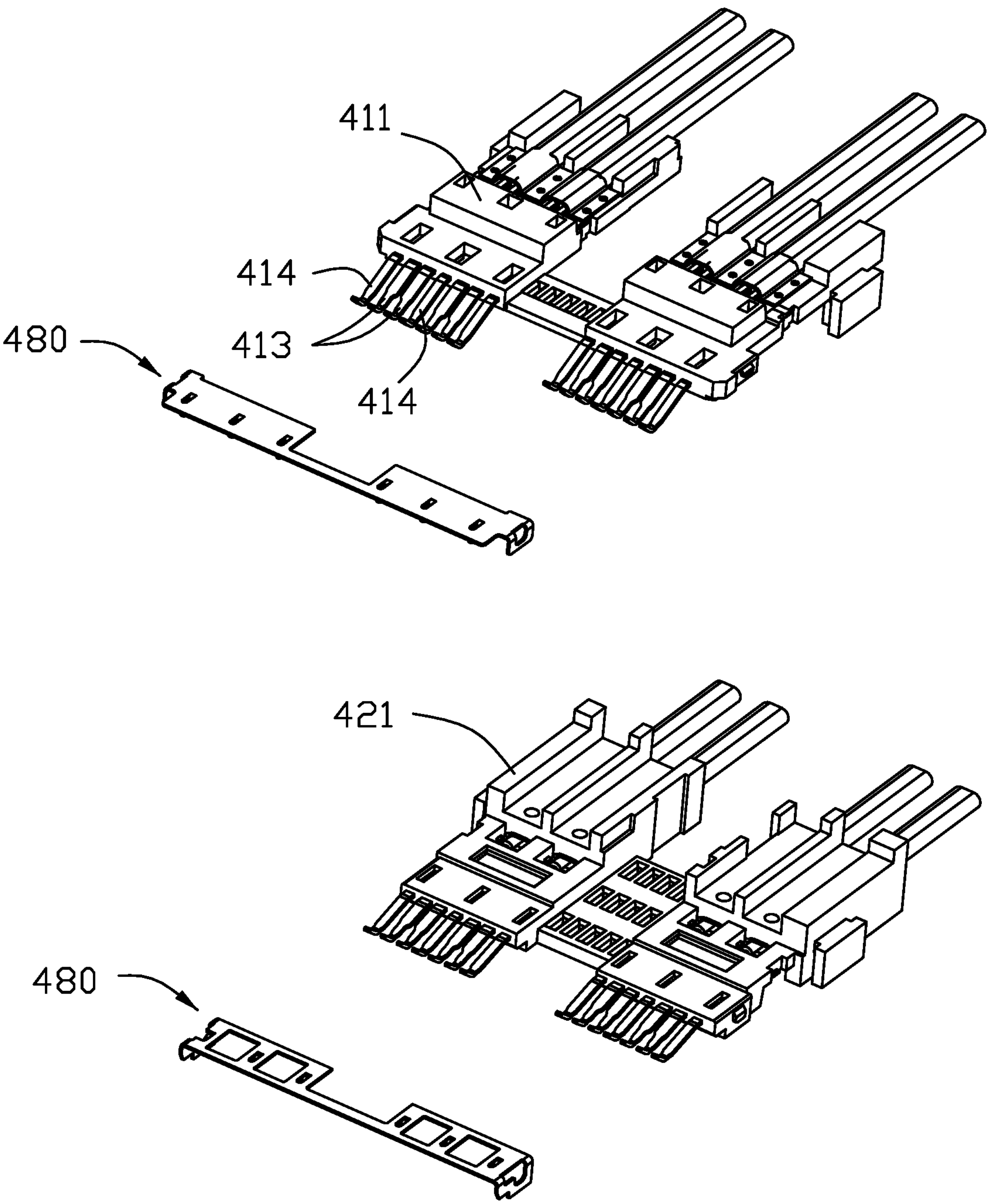
FIG. 9 is a an exploded perspective view of the high-speed terminal module and the ground member separated from the high-speed terminal module of the upper part of FIG. 7.
Figure 10:
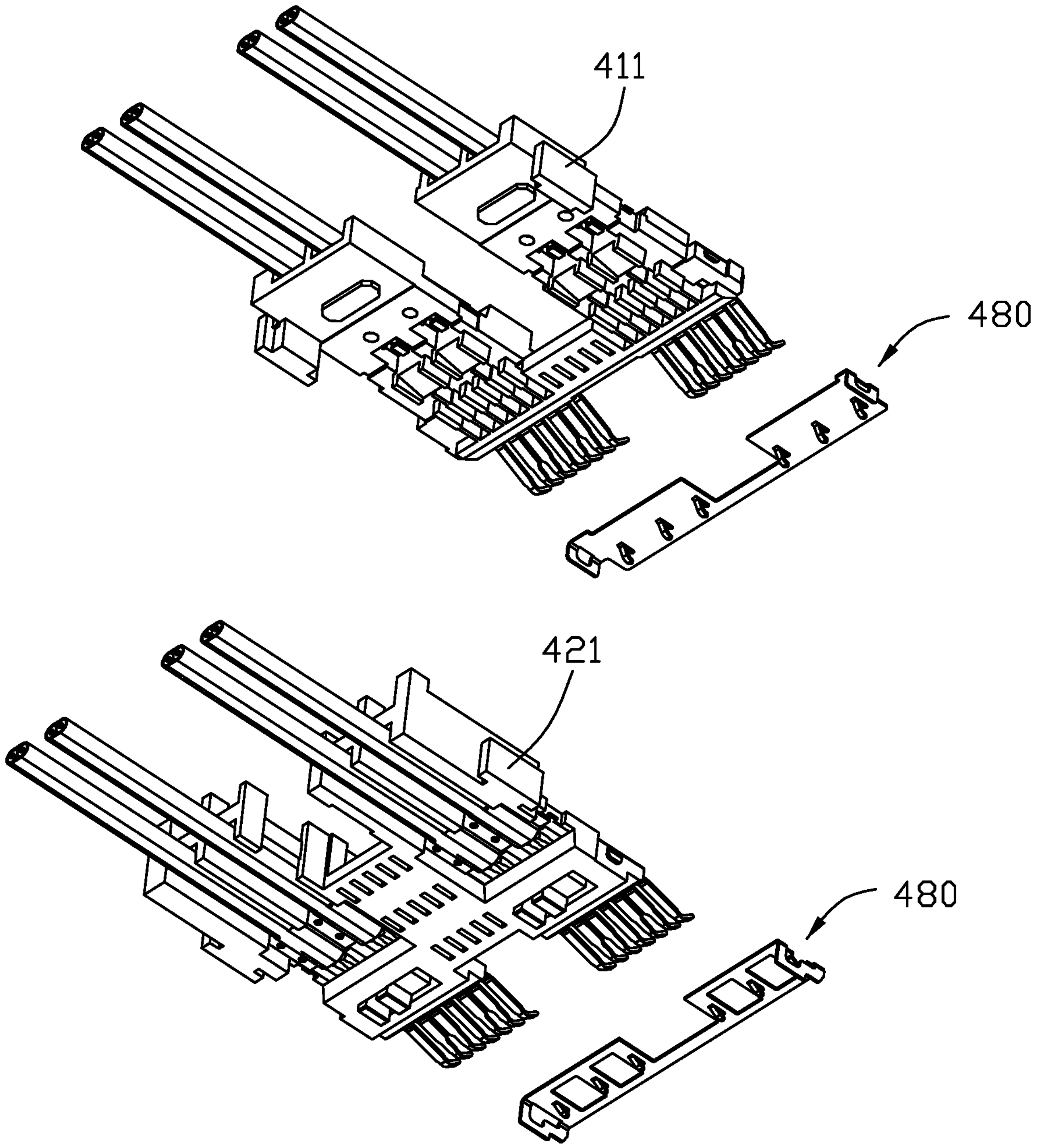
FIG. 10 is another exploded perspective view of the high-speed terminal module and the ground member separated from the high-speed terminal module of the upper part of FIG. 9.
Figure 11:
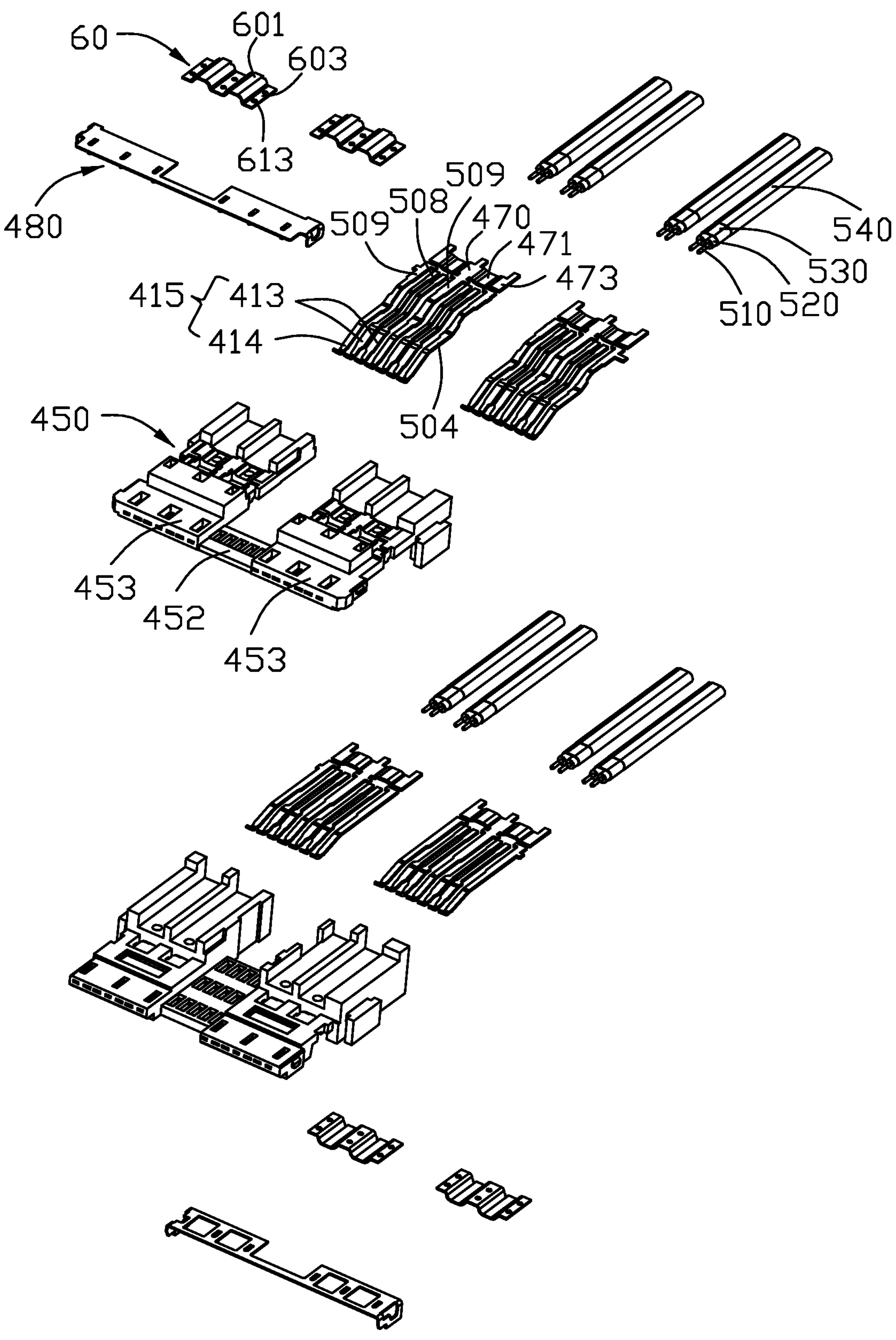
FIG. 11 is a further exploded view of the high-speed terminal module of the upper part of FIG. 9.
Figure 12:
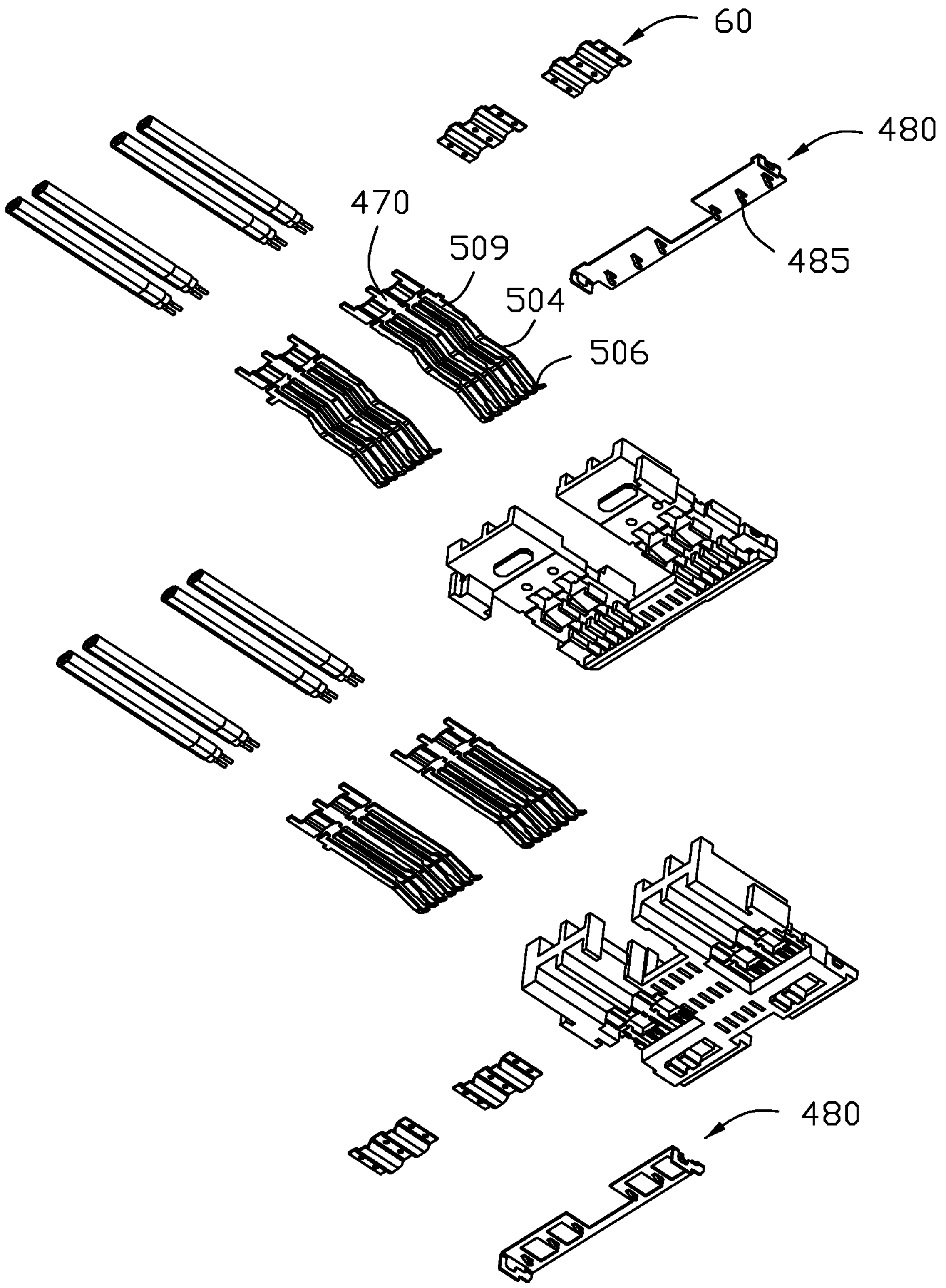
FIG. 12 is another exploded view of the high-speed terminal module of the upper part of FIG. 11.
Figure 13:
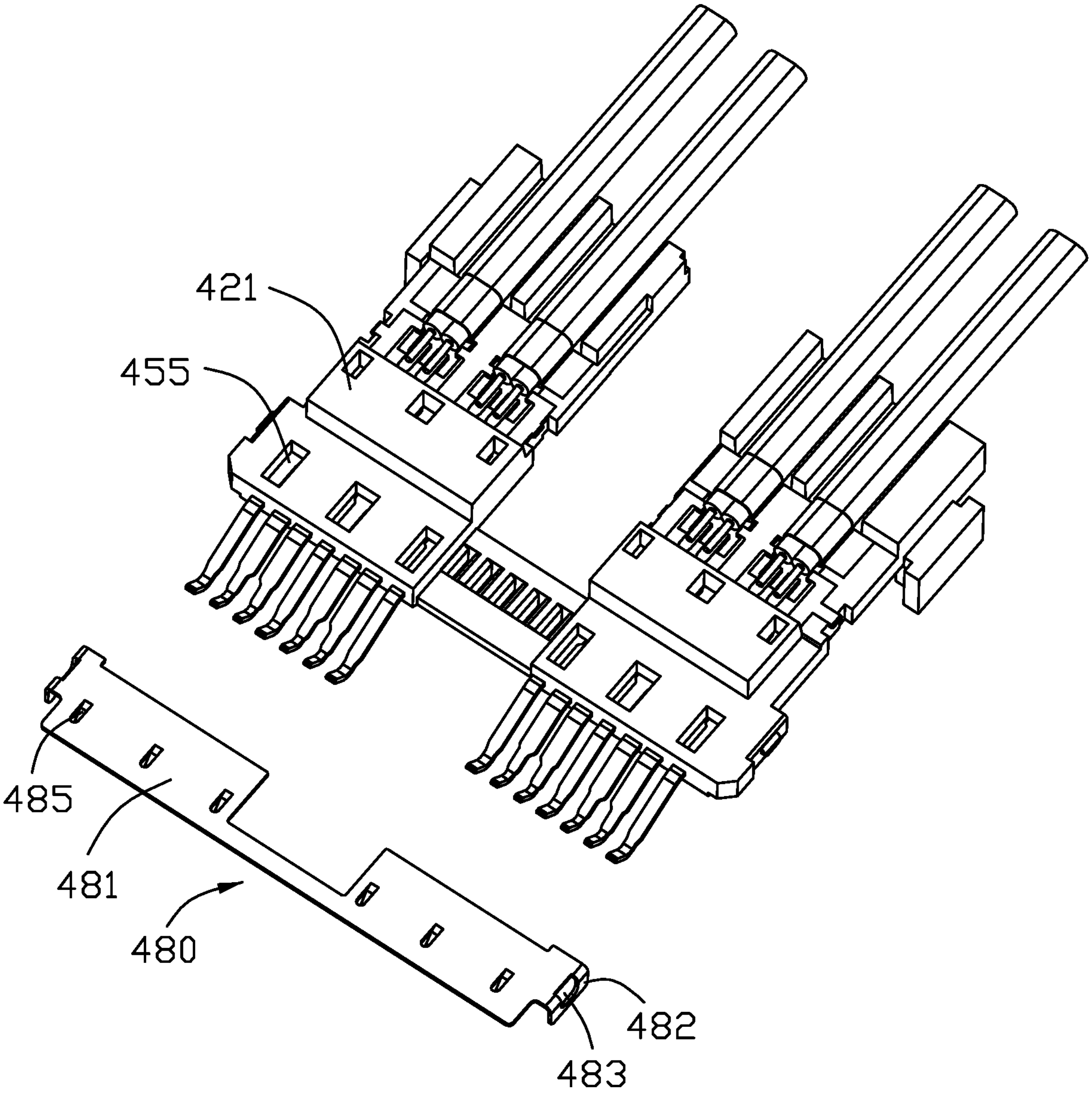
FIG. 13 is an exploded view of the first terminal module of the high-speed terminal module of the upper part of FIG. 9.
Figure 14:
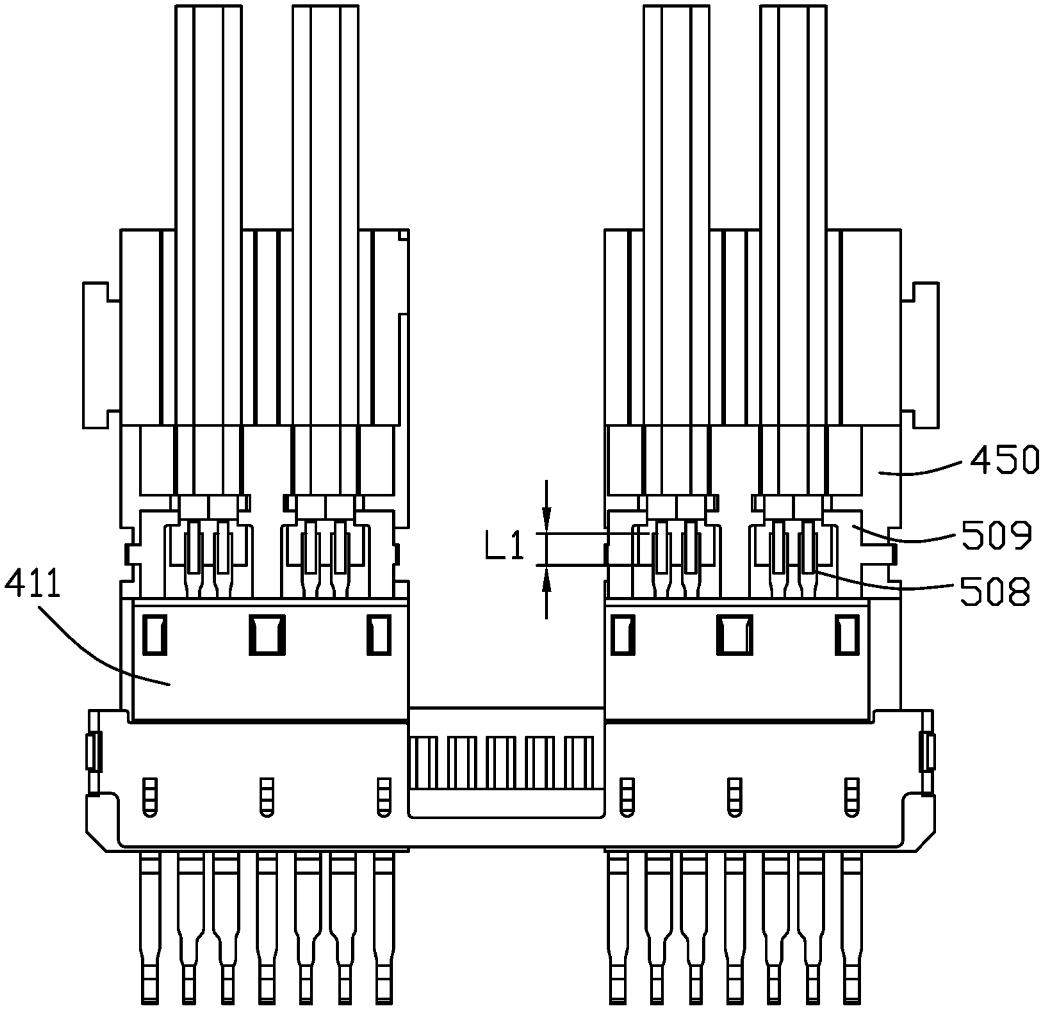
FIG. 14 is a top view of the first terminal module of the high-speed terminal module of the upper part of FIG. 7.
Figure 15:
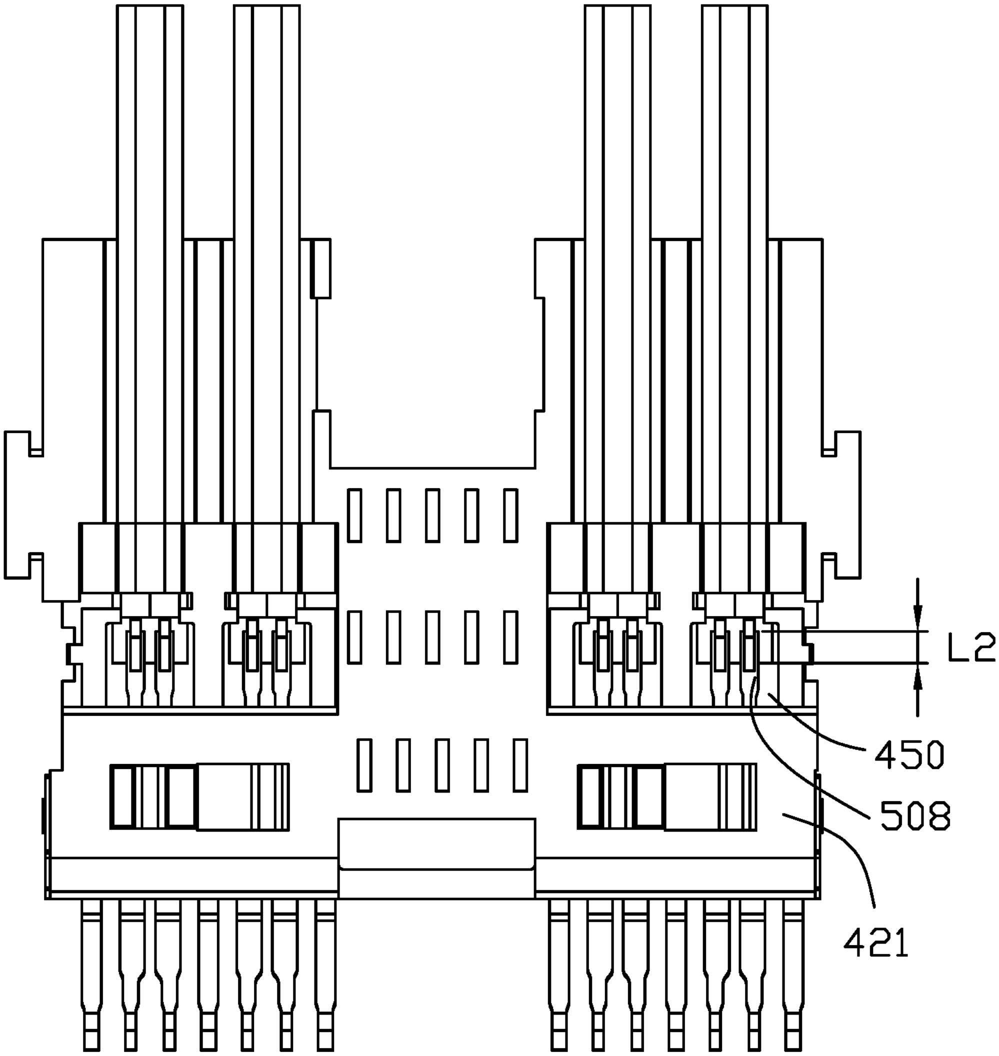
FIG. 15 is a top view of the second terminal module of the high-speed terminal module of the upper part of FIG. 7.
Figure 16:
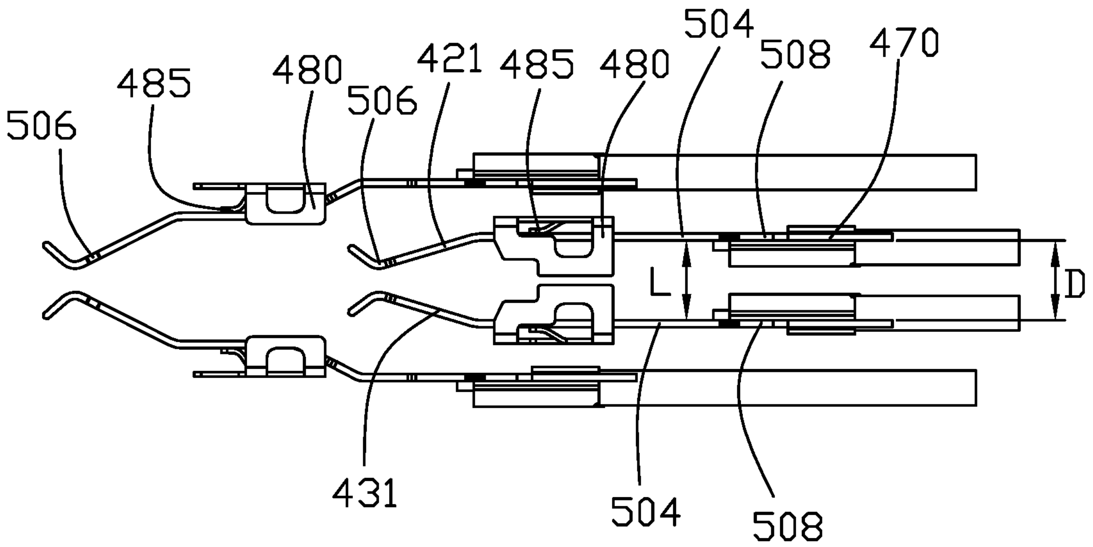
FIG. 16 is a front view of the high speed terminal of FIG. 3, without showing the insulator.
Figure 17:
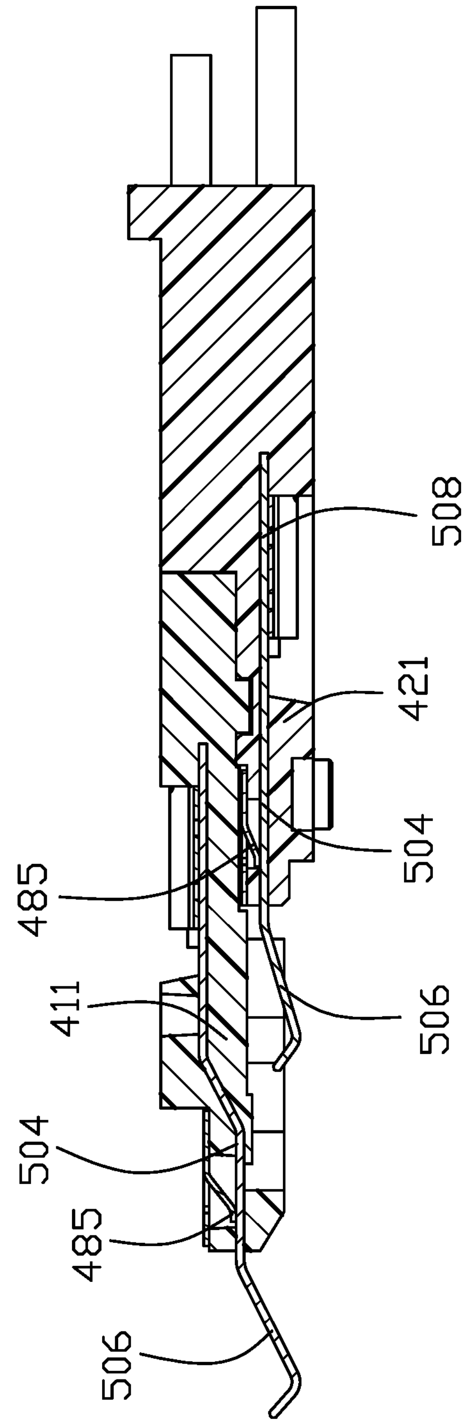
FIG. 17 is a cross-sectional view taken along line 17-17 of the high-speed terminal module of FIG. 4.
Figure 18:
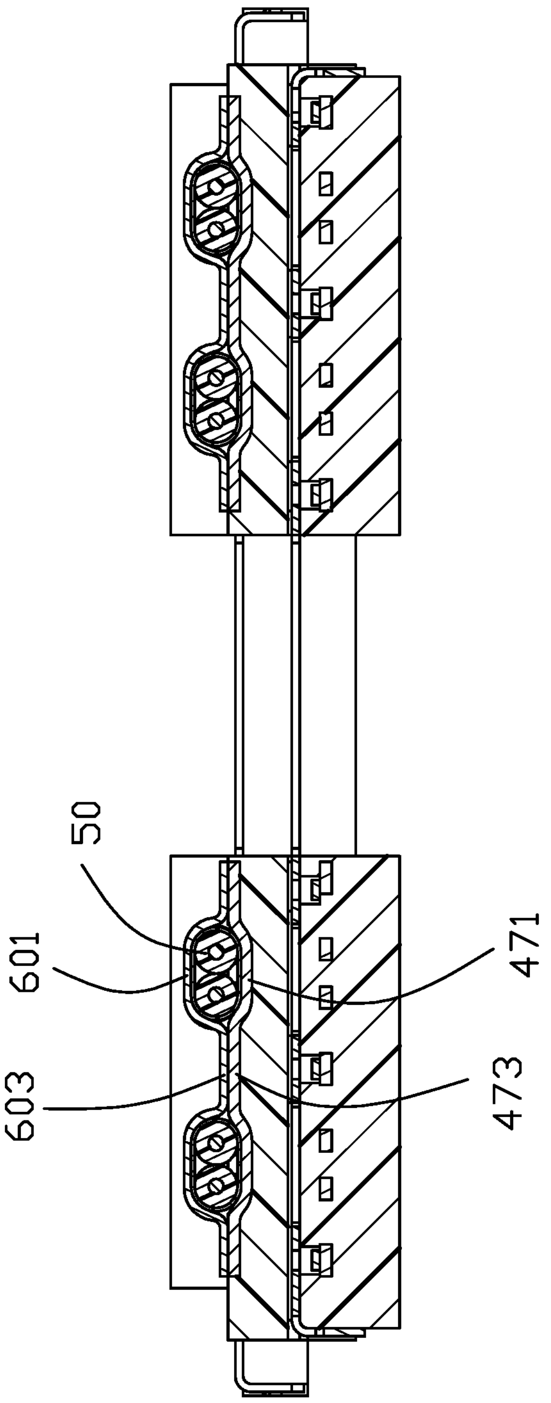
FIG. 18 is a cross-sectional view taken along line 18-18 of the high-speed terminal module of FIG. 4.

Referring to FIGS. 1-18, an electrical connector assembly 100 in accordance with the present invention is shown. The electrical connector assembly 100 can be matched with a mating connector (not shown) along a front-to-back direction and comprises an insulative housing 10, a terminal module assembly 20 received in the insulating housing 10. The terminal module assembly 20 includes a terminal module 40 and a cable 50 connected to the terminal module 40 and extending backward out of the insulating housing 10. The housing 10 has a front mating slot 101 and a rear receiving space 102. The terminal module assembly 40 is received in the rear receiving space 102 from rear to the front. The front mating slot 101 can accommodate the mating tongue of the mating connector.

The terminal module assembly 20 includes an upper part 401, a lower part 402 stacked with each other in the vertical direction, and a metal fixing member 460 fixing the upper part 401 and the lower part 402 together. Each of the upper part 401 and the lower part 402 of the terminal module 40 include a high-speed terminal module 404 and a sideband terminal module 405. The high-speed terminal module 404 of the upper part 401 and the lower part 402 are essentially arranged in a mirror image manner in the vertical direction. The high-speed terminal module 404 of the upper part 401 includes a first terminal module 411 and a second terminal module 421 under the first terminal module 411. The high-speed terminal module 404 of the lower part 402 includes a third terminal module 431 and a fourth terminal module 441 under the third terminal module 431. Each of the first terminal module 411, the second terminal module 421, the third terminal module 431 and the fourth terminal module 441 includes a unitary insulator 450 and a plurality of high-speed terminals 415 integrally formed with the insulator 450 via insert-molding.

Based upon the similarity of the four terminal modules, only the first terminal module 411 is described in detail. The insulator 450 includes a middle sector 452 and a pair of side sectors 453 located on two sides of the middle sector 452 in the transverse direction. The high-speed terminals 415 are divided into two groups retained in the corresponding side sectors 453. Each group of the high-speed terminals 415 includes two pairs of differential pair terminals 413 arranged alternately with three ground terminals 414 in the transverse direction.

Each of the sideband terminal module 405 in the upper part 401 and lower part 402 includes a plurality of wafer 561 stacked in the transverse direction. Each of the wafers 561 includes a fixing member 566, and an upper sideband terminal 562 and a lower sideband terminal 562 integrally formed with the fixing member 566 via an insert-molding process. Each of the sideband terminals of the sideband terminal module 405 is assembled in the middle sector 452 of the corresponding insulator 450. In this way, in the transverse direction, the two groups of the conductive terminals 415 are respectively located on two sides of the sideband terminals.

Each of the sideband terminal 562, the differential pair terminal 413 and the ground terminal 414 has a mating portion 506 at the front for mating with the mating connector, a tail opposite to the mating portion 506 and a transition portion 504 therebetween. The mating portions 506 of the sideband terminals 562 is aligned with the corresponding mating portions 506 of the high-speed terminals 415 of the high-speed terminal module 404 in the transverse direction. Each of the tails 507 of the sideband terminals 562 can be directly mounted on a printed circuit board. Each of the tails 508 of the differential pair terminal 413 mechanically and electrically connected to the corresponding cable 50. The rear end of the high-speed terminal 415 on each side is provided with a ground bar 470. The ground bar 470 is integrally connected with at least one of the three ground terminals 414. Specifically, in the present invention, the ground bar 470 is integrally connected with the ground terminal 414 in the middle.

The terminal module 40 further comprises a ground member 480. The ground member 480 is installed on the corresponding insulator 450, and is mechanically and electrically connected to the corresponding ground terminal 414, so as to move the crosstalk to a higher frequency, reduce the crosstalk in the operating frequency, and improve the SI performance. Specifically, the insulator 450 has an opening 455 exposing the transition portion 504 of the ground terminal 414. The ground member 480 is connected to the transition portions 504 of the corresponding ground terminals 414 through the openings 455. The ground member 480 includes a horizontal portion 481 extending along a transverse direction and two mounting portions 482 located at two sides of the horizontal portion 481. The mounting portion 482 has mounting opening 483 that can be fastened to corresponding lateral side of the insulator 450. The horizontal portion 481 has a plurality of contact fingers 485 protruding toward to the corresponding ground terminals 414. The contact fingers 485 are resiliently abutted against the corresponding transition portions 504 of the ground terminals 414. The ground member 480 spans the entire insulator 450 to electrically and mechanically connect the ground terminals 414 of the high-speed terminals 415 on the two side sectors in series of the insulator 450.

The transition portion 504 and the tail 508 of each of the differential pair terminals 413 of the second terminal module 421 are on a same straight line along the front-to-back direction. The transition portion 504 and the tail 508 of each of the differential pair terminals 413 of the third terminal module 431 are on a same straight line along the front-to-back direction. The distance D between the tail 508 of the differential pair terminal 413 of the second terminal module 421 and the tail 508 of the differential pair terminal 413 of the third terminal module 431 in the vertical direction is equal to the distance L between the transitions 504 thereof. The distance D is greater than 1.7 mm, so as to reduce signal crosstalk between the differential pair terminals 413 of the second terminal module 421 and the third terminal module 431 during signal transmission.

The ground terminals 414 and the differential pair terminals 413 are connected together by a strip (not shown) which is removed after the ground terminal 414 and the differential pair terminal 413 are integrally formed with the insulator 450. The tails 508 of the differential pair terminals 413 of the first terminal module 411, the second terminal module 421, the third terminal module 431, and the fourth terminal module 441 extend backward beyond the corresponding insulator 450 to facilitate the cutting of the strip, and separate the differential pair terminal 413 and the ground terminal 414. Based upon the similarity of the four terminal modules, only the first terminal module 411 is described in detail. The dimension L1 of the tail 508 of each differential pair terminal 413 of the first terminal module 411 extends backward beyond the insulator 450 is not greater than 0.7 mm. Similarly, the dimension L2 of the tail 508 of each of the differential pair terminals 413 of the second terminal module 421 extends backward beyond the insulator 450 is not greater than 0.7 mm to reduce crosstalk and improve the effectiveness of signal transmission. Specifically, in the present invention, considering the reduction of crosstalk and the space required for cutting the strip, the dimension of the tails 508 of the differential pair terminal 413 of each terminal module extends backward the corresponding insulator 450 is greater than 0.6 mm and less than 0.7 mm.

The cable 50 includes a pair of inner conductors 510, a pair of inner insulative layers 520, a common metal shielding layer 530 and an outer layer 540 covering the common shielding layer 530. The pair of inner conductors 510 are soldered to the corresponding tails 508 of the differential pair terminals 413.

The electrical connector assembly 100 further includes a metal shield member 60 which is discrete from the ground terminal 414. The ground bar 470 cooperates with the metal shield member 60 to sandwich the corresponding cables 50 in the vertical direction. The shielding layer 530 is contacts and electrically connects to the ground bar 470 and the metal shielding member 60. Specifically, each of the ground bar 470 includes two first bulged sections 471 and three first level sections 473. The metal shield member 60 includes two second bulged sections 601 and three second level sections 603. The first bulged sections 471 and the second bulged sections 601 cooperate with each other to completely cover the exposed part of the common shielding layer 530. Both the first bulged sections 471 and the second bulged sections 601 are in contact with the corresponding common shielding layer 530 and are electrically connected thereto.

The metal shield member 60 is not only mechanically and electrically connected to the tail portion 509 of the ground terminal 414 but also mechanically and electrically connected to the ground bar 470. Specifically, in the present invention, the rear half of the second level sections 603 of the metal shield member 60 cooperates with the corresponding first level sections 473 in the vertical direction. The front half of the second level sections 603 of the metal shield member 60 cooperates with the corresponding ground terminal 414 in the vertical direction. Each of the second level section 603 has holes 613 for solder, through which the metal shield member 60 directly soldered to the ground bar 470 and the ground terminal 414. In the present invention, the metal shielding member 60 connects the common shielding layer 530, the ground terminal 414 and the ground bar 470 in series, which has a better ground effect. The tail 509 of the ground terminal 414 is connected in series through the metal shield 60, and the transition portion of the ground terminal 414 is connected in series through the ground member 480. The ground terminal 414 is connected to the ground through multiple points in series, which improves the signal transmission performance of the electrical connector assembly 100.

In the electrical connector assembly 100 of the present invention, the ground member 480 is mechanically and electrically connected to the corresponding ground terminal 414 to form a common ground, which moves the crosstalk to a higher frequency, reduce the crosstalk in the working frequency, improve the transmission performance of the high-speed terminal module signal, and ensure the effective transmission of the signal.

The electrical connector assembly 100 of the present invention conforms to the specification of QSFP-DD, which defines eight transmitting channels and eight receiving channels, the signal transmission rate of each channel can reach 50 Gbps or above. Of course, the present invention can also be applied to high-speed electrical connectors assembly such as SFP-DD, SFP, OSFP, etc.

The invention claimed is:

1. An electrical connector assembly comprising:

an insulative housing forming a front mating slot and a rear receiving space;

a terminal module assembly received in the insulative housing and including an upper part and a lower part stacked with each other in a vertical direction, each of the upper part and the lower part comprising a high-speed terminal module and a sideband terminal module, the high-speed terminal module having an insulator and a plurality of high-speed terminals fixed in the insulator, the high-speed terminals comprising a plurality of ground terminals and differential pair terminals arranged alternately with the ground terminals in a transverse direction perpendicular to the vertical direction, each of the differential pair terminals and the ground terminals defining a mating portion, a tail opposite to the mating portion, and a transition portion therebetween; and a ground member mechanically and electrically connected to the transition portions of the ground terminals to form a common ground.

2. The electrical connector assembly as claimed in claim 1, wherein the ground member has a plurality of contact fingers protruding toward corresponding ground terminals, and the insulator has a plurality openings through which the contact fingers are mechanically and electrically connected to the corresponding ground terminals.

3. The electrical connector assembly as claimed in claim 2, wherein the contact fingers resiliently abut against corresponding ground terminals.

4. The electrical connector assembly as claimed in claim 3, wherein the ground member includes a horizontal portion extending along the transverse direction and two mounting portions located at two sides of the horizontal portion.

5. The electrical connector assembly as claimed in claim 3, wherein the mounting portion has a mounting opening for fixing to corresponding lateral sides of the insulator.

6. The electrical connector assembly as claimed in claim 3, further including a cable connected to the high-speed terminal module, a ground bar located at rear end of the ground terminals, and a metal shield member separate from the ground terminals.

7. The electrical connector assembly as claimed in claim 6, wherein the ground bar cooperates with the metal shield member to sandwich the cable in the vertical direction, and the metal shield member is mechanically and electrically connected to the tails of the ground terminals and to the ground bar.

8. The electrical connector assembly as claimed in claim 6, wherein the cable includes a pair of inner conductors, a pair of inner insulative layers, and a common metal shielding layer, the inner conductors are mechanically and electrically connected to corresponding differential pair terminals, and the metal shielding layer is mechanically and electrically connected to the ground bar and the metal shield member.

9. The electrical connector assembly as claimed in claim 1, wherein the sideband terminal module comprises a plurality of sideband terminals assembled in a middle area of the insulator, the ground terminal and the differential pair terminal are divided into two groups fixed on two sides of the sideband terminals in the transverse direction, and the ground member electrically and mechanically connects the ground terminals on the two sides of the sideband terminals.

10. The electrical connector assembly as claimed in claim 1, wherein the high-speed terminal module of the upper part includes a first terminal module and a second terminal module under the first terminal module, and the high-speed terminal module of the lower part includes a third terminal module and a fourth terminal module under the third terminal module.

11. The electrical connector assembly as claimed in claim 10, wherein each of the first terminal module, the second terminal module, the third terminal module, and the fourth terminal module has a unitary insulator and a plurality of ground terminals and differential pair terminals integrally formed with the insulator via insert-molding.

12. The electrical connector assembly as claimed in claim 11, wherein a distance between the tails of the differential pair terminals of the second terminal module and the tails of the differential pair terminals of the third terminal module in the vertical direction is equal to a distance between the transition portion of the differential pair terminals of the second terminal module and the transition portion of the differential pair terminals of the third terminal module.

13. The electrical connector assembly as claimed in claim 12, wherein the transition portion and the tail of each of the differential pair terminals of the second terminal module are on a same straight line along a front-to-back direction, and the transition portion and the tail of each of the differential pair terminals of the third terminal module are on a same straight line along the front-to-back direction.

14. The electrical connector assembly as claimed in claim 13, wherein a distance between the tails of the differential pair terminals of the second terminal module and the tails of the differential pair terminals of the third terminal module in the vertical direction is greater than 1.7 mm.

15. The electrical connector assembly as claimed in claim 10, wherein the tails of the differential pair terminals of the first terminal module, the second terminal module, the third terminal module, and the fourth terminal module extend backward beyond the corresponding insulator an extent less than 0.7 mm.

16. The electrical connector assembly as claimed in claim 15, wherein the tails of the differential pair terminals of the first terminal module, the second terminal module, the third terminal module, and the fourth terminal module extend backward beyond the corresponding insulator an extent greater than 0.6 mm and less than 0.7 mm.

17. The electrical connector assembly as claimed in claim 1, further comprising a metal fixing member fixing the upper part and the lower part together.

* * * * *